United States Patent [19]
Schrader et al.

[11] Patent Number: 5,655,331
[45] Date of Patent: Aug. 12, 1997

[54] DRIVE SYSTEM FOR MOVING A LOCKABLE VEHICLE PART

[75] Inventors: Juergen Schrader, Weil in Schoenbuch; Eckart Schuler; Peter Mueller, both of Sindelfingen, all of Germany

[73] Assignee: Mercedes-Benz AG, Stuttgart, Germany

[21] Appl. No.: 647,317

[22] Filed: May 9, 1996

[30] Foreign Application Priority Data

May 9, 1995 [DE] Germany .................. 195 16 876.3

[51] Int. Cl.⁶ .................................................. E05F 15/02
[52] U.S. Cl. .................... 49/280; 49/281; 49/279
[58] Field of Search ...................... 49/280, 279, 281

[56] References Cited

U.S. PATENT DOCUMENTS

| | | |
|---|---|---|
| 2,999,683 | 9/1961 | Pickles . |
| 3,157,429 | 11/1964 | Harms et al. . |
| 3,420,000 | 1/1969 | Esser ........................... 49/280 |
| 4,361,985 | 12/1982 | DeMarco . |
| 4,655,004 | 4/1987 | Caillet ........................... 49/280 |
| 4,739,585 | 4/1988 | Pickles . |
| 4,802,604 | 2/1989 | Lindsey ........................ 49/280 X |

FOREIGN PATENT DOCUMENTS

| | | |
|---|---|---|
| 0 260 436 | 3/1988 | European Pat. Off. . |
| 641987 | 8/1950 | United Kingdom . |
| 708591 | 5/1954 | United Kingdom . |
| 1 548 929 | 7/1979 | United Kingdom . |

*Primary Examiner*—Kenneth J. Dorner
*Assistant Examiner*—Curtis Cohen
*Attorney, Agent, or Firm*—Evenson, McKeown, Edwards & Lenahan, P.L.L.C.

[57] ABSTRACT

A drive system is provided for moving a lockable vehicle part. The drive system includes a drive element that operates with a change in length. The element is supported at its ends on the vehicle part and on the body. A releasable snap lock is provided by which the vehicle part is locked in one of its end positions. The snap lock is released by a control stroke of the drive element effectively connected with the release mechanism of the snap lock. The control stroke precedes the working stroke to move the vehicle part by connecting one end of the drive element to a release mechanism. In order to reduce the space required in the vehicle for the drive system, a rotary joint is provided as the release mechanism for the control stroke of the drive element.

8 Claims, 2 Drawing Sheets

DRIVE SYSTEM FOR MOVING A LOCKABLE VEHICLE PART

BACKGROUND AND SUMMARY OF THE INVENTION

The invention relates to a drive system for moving a lockable vehicle part and, more particularly, to a drive system having a drive element operating with a change in length, the element being supported at its ends on the vehicle part and on the body. The drive system also has a releasable snap lock by which the vehicle part is locked in one of its end positions. The snap lock is released by a control stroke of the driving element actively connected with the release mechanism of the snap lock. The control stroke precedes the working stroke to move the vehicle part by connecting one end of the driving element with a release mechanism.

A drive system of the above-mentioned type is known from U.S. Pat. No. 2,999,683 for moving a trunk lid between its open and closed positions. The upper end of the drive element is mounted on a bearing block on the trunk lid, while the lower end of the drive element is supported on a bearing block on the body by a rocker bearing forming the release mechanism. If the drive element is driven in the "extend" direction with the trunk lid closed, the lever arm of the rocker bearing articulated at the lower end of the drive element is initially pivoted downward, with the lock of the trunk lid being triggered by a cable connection to the lever arm. As the drive element extends further, the lever arm strikes a stop, whereupon the trunk lid is raised into its open position by the drive element.

One disadvantage of the known drive system is the fact that considerable space is required in the vehicle and is not available in every vehicle design.

There is therefore needed a drive system of the above-mentioned type in which the space required to install the drive system can be made smaller.

These needs are met by a drive system for moving a locking vehicle part. The drive system includes a drive element operating with a change in length, the element being supported at its ends on the vehicle part and on the body. The drive system also has a releasable snap lock by which the vehicle part is locked in one of its end positions. The snap lock is released by a control stroke of the driving element actively connected with the release mechanism of the snap lock. The control stroke precedes the working stroke to move the vehicle part by connecting one end of the driving element with a release mechanism. A rotary joint is provided as the, release mechanism for the control stroke of the driving element such as a hydraulic cylinder.

It is an advantage of the present invention that a pivot pin is slidably guided in an elongated hole to form the rotary joint. In particular preferred embodiments, the length of the elongated hole is set for the control stroke of the drive element and the pivot pin is automatically locked in its opposite end positions in the elongated hole. The pivot pin is locked via a leaf spring pair by whose arrangement the displacement path of the pivot pin is increasingly narrowed toward the center of the length of the elongated hole.

In still further preferred embodiments, the elongated hole is provided at one end area of the drive element. The elongated hole is made in a foot of the drive element and the pivot pin is mounted immovably on the body.

In still further preferred embodiments, a pivotable supporting frame of the motor vehicle lid is movable by a driving element such as a hydraulic cylinder. The motor vehicle lid is mounted to pivot in the opposite direction on the supporting frame.

In another preferred embodiment, the driving element that operates with a change in length is a double-acting hydraulic cylinder.

Other objects, advantages and novel features of the present invention will become apparent from the following detailed description of the invention when considered in conjunction with the accompanying drawings.

DETAILED DESCRIPTION OF THE DRAWINGS

FIGS. 1 to 4 show a motor vehicle rear end 1 of a convertible, whose trunk lid 2 covers an accommodation space 3 for a folding roof 4 and for luggage, not shown.

Figure 4:
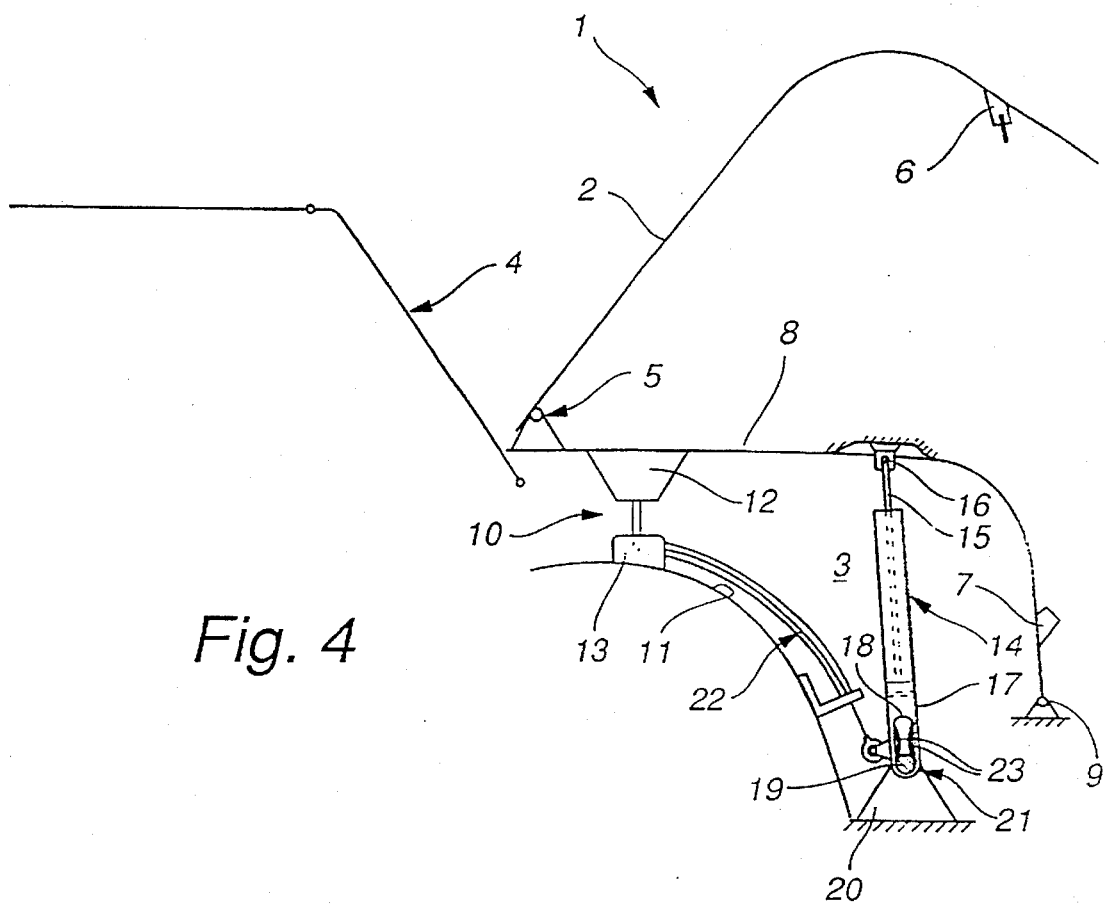
FIG. 4 shows the side view of FIG. 1 with the supporting frame locked and the trunk lid raised.

In order to be able to load the accommodation space 3 from the rear like a trunk, the trunk lid 2 is mounted in the vicinity of its forward edge by hinged joints 5 so that it can pivot around a horizontal transverse axis of the vehicle and is provided in the central area of its rear edge with a lid lock 6. After the lid lock 6 has been unlocked by a push button or the like, its engagement with a fixed lower part 7 of the lock is released so that the trunk lid 2 can be raised forward into its open position as shown in FIG. 4. The trunk lid 2 is also angled or bent over the rear portion of its length so that it can cover a loading opening that extends almost as far down as the level of a rear bumper (not shown).

Figure 3:
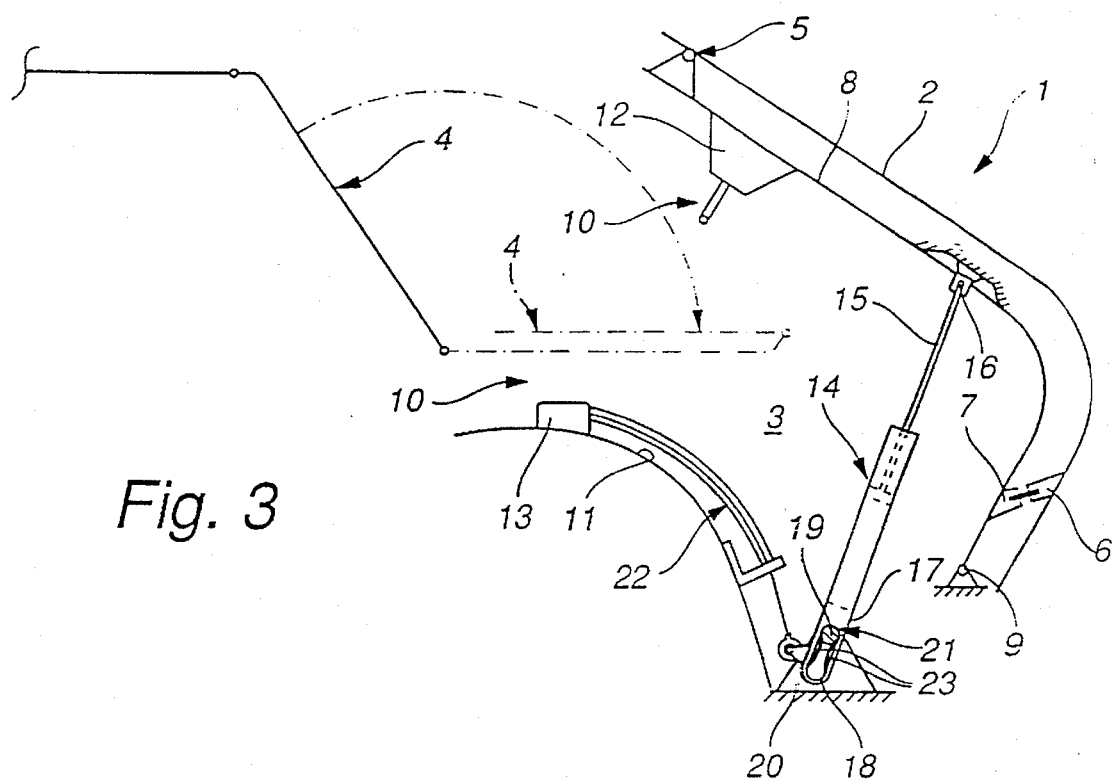
FIG. 3 shows the side view of FIG. 1 with the supporting frame raised.

As shown in FIG. 3, the trunk lid 2 alternatively can be raised rearward similarly to a lid 2 of a convertible top storage compartment so that the folding roof 4, consisting of two roof parts connected together with an articulation, can be folded down into the accommodation space 3. To permit this dual function of the trunk lid 2, it is mounted by hinges 5 to a supporting frame 8 that extends approximately parallel to the length of the trunk lid 2 and below the latter, in other words it is also bent downward over the rear portion of its length. At the lower end of the rear portion of its length, the supporting frame 8 is pivotably mounted on the body of the convertible by hinged joints 9. Since the geometric pivot axis of the hinged joints 9 runs horizontally in the direction of the width of the vehicle and hence parallel to the pivot axis of hinge 5, the supporting frame 8 is mounted pivotably to move in the opposite direction from the trunk lid 2 itself. In addition, the lower part 7 of the lock is mounted on a cross strut of the supporting frame 8, designed as a tubular frame for reasons of stability. With the lid lock 6 locked, the trunk lid 2 is held relatively immovably with respect to the supporting frame 8.

For relative actuation of the trunk lid 2 with respect to the supporting frame 8, it is necessary that the supporting frame 8 be held so that it cannot pivot in its folded-down initial position. For this purpose, the ribs of supporting frame 8 that run laterally along trunk lid 2 are each lockable to the body of motor vehicle rear end 1 via a snap lock, with the two locking positions being provided on the tops of lateral wheel housings 11 of the motor vehicle rear end 1.

The snap lock 10, shown for only one side of the vehicle, comprises a locking pin part 12 projecting from the underside of the supporting frame 8. The part 12 cooperates in a locking fashion with a rotary latch lock 13. The lock is mounted in a lock housing fastened to the top of the wheel housing 11. Snap locks 10 are very compact locks, like those used for locking engine hoods, with a locking pawl cooperating directly in a locking fashion with a forked end of the rotary latch. These snap locks 10 also have a release lever which, when pivoted against a spring force, moves the locking pawl into a position in which it releases the rotary latch. As a result, the forked rotary latch, under spring tension, snaps into its released position, thus ejecting the locking pin of the locking pin part 12, so that the lock is released.

For a pivoting drive of the supporting frame 8 between its folded-down initial position and its open position in which it is raised around hinged joint 9, a drive system is provided. The drive system includes two hydraulic cylinders 14. The two hydraulic cylinders 14 arranged symmetrically mirrorwise relative to the lengthwise central plane of vehicle lid 1 are mounted closely behind their corresponding wheel housings 11 and hence at a sufficient distance from the pivot axis of the hinged joint 5. The upper ends of their piston rods 15, designed as forked heads, are articulated by axial pins 16 to the associated lateral ribs of the supporting frame 8. The cylinder tube 17 of the hydraulic cylinder 14, below its working chamber that receives the piston, has a foot in which an elongate hole 18 has been made.

For support relative to the body of the motor vehicle rear end 1, a cylindrical pivot pin 19 is provided. The cylindrical pivot pin 19 is held, projecting laterally, immovably by a bearing block 20 and passes through the hollow cross section of the elongate hole 18 with a close fit. The pivot pin 19 is also held in a manner not shown by axial securing devices in the elongate hole 18, so that the two cooperate as a rotary joint 21 and permit an axial extension of the cylinder tube 17 relative to the pivot pin 19 that corresponds to the length of the elongate hole 18. The resultant return stroke of the hydraulic cylinder 14 is used as a control stroke to unlock the supporting frame 8. For this purpose, the foot of the hydraulic cylinder 14 is coupled movement-wise by a cable 22 with the release lever of the associated rotary latch lock 13. The cable 22 is a Bowden cable whose sleeve jacket lies along the circumference of the wheel housing 11.

Alternatively, it would also be possible, depending on design constraints, to provide the elongate hole on the body and to connect the pivot pin displaceable therein permanently with the foot of the hydraulic cylinder.

In order to achieve stable end positions of pivot pin 19 in the elongate hole 18, two leaf springs 23 are provided on the foot of hydraulic cylinder 14 for locking. The leaf springs 23 are mounted symmetrically mirrorwise opposite one another on the long sides of the elongate hole 18. The springs are bent convexly over their lengths with respect to the central lengthwise axis of the elongate hole 18. As a result, they narrow the hollow cross section of the elongate hole 18 toward the middle of the length thereof. The lengths of leaf springs 23 are also dimensioned sufficiently so that even in the end positions of pivot pin 19, they still abut its circumference for support, so that rattling noises can be prevented.

Figure 1:
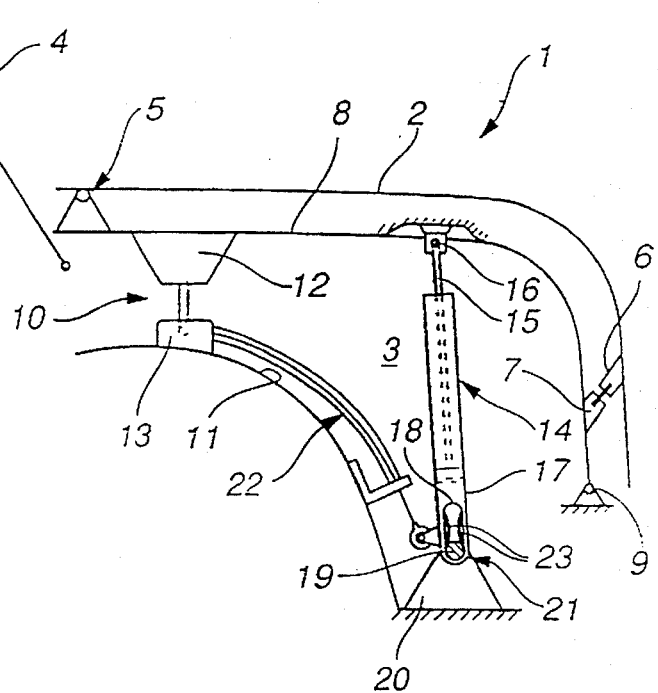
FIG. 1 is a schematic side view of an automobile rear end with a drive system for moving a supporting frame-locked to the body, for a trunk lid.
Figure 2:
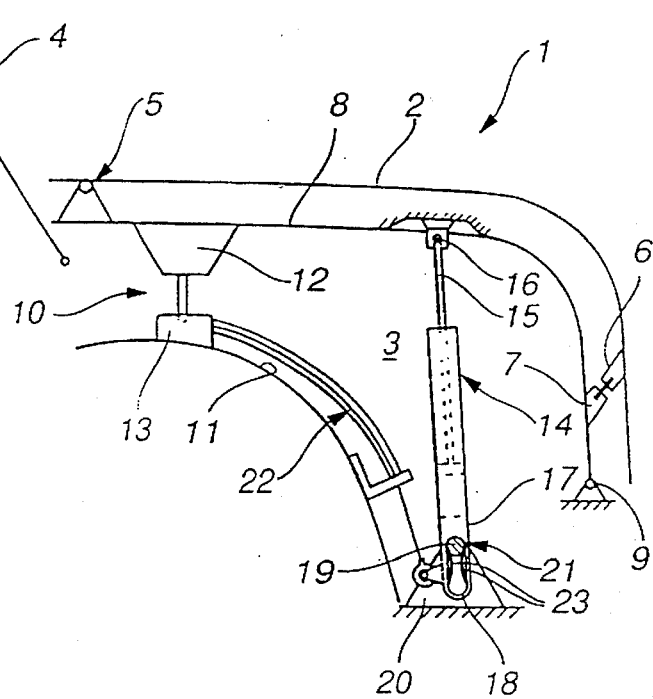
FIG. 2 shows the side view of FIG. 1 with the supporting frame unlocked.

With the supporting frame 8 locked and with the trunk lid 2 locked according to FIG. 1, when the two hydraulic cylinders 14 are pressurized on their plunger piston sides, their cylinder tubes 17 initially move downward relative to piston rods 15, said rods being held immovably, with elongate holes 18 being displaced downward relative to pivot pins 19. As a result of the advance of the pivot pins 19 in the elongate holes 18, the leaf springs 23 are flattened and thus pushed laterally out of the displacement paths of the pivot pins 19. After the pivot pin 19 has passed the center of the length of elongate hole 18 before reaching its upper end position, the leaf springs 23 again resume their curved locking and supporting positions. As a result of this control stroke of the hydraulic cylinder 14, the cable 22 is pulled downward, as shown in FIG. 2, so that the rotary latch lock 13 is released by the movement of the cable. Since the supporting frame 8 is now unlocked and the cylinder tube 17 can no longer be lowered relative to the pivot pin 19, the supporting frame 8 is caused to pivot by the piston rod 15 of hydraulic cylinder 14, said rod extending until it reaches its raised open position as shown in FIG. 3.

After the folding roof 4 has been lowered completely, the hydraulic cylinders 14 are driven in the opposite direction, in other words they are pressurized on their rod sides. As a result, hydraulic cylinders 14 are retracted and initially pull the supporting frame 8 downward until the transverse shackles of locking pin parts 12 rest on the rotary latch locks 13 of the respective snap lock 10. In this position, further lowering of supporting frame 8 is prevented by the forked rotary latches which are still held in their released positions by spring tension, so that the cylinder tube 17 can be displaced upward initially relative to its piston rod 15 into its starting position as shown in FIG. 1. As soon as the lower end of the elongate hole 18 slips on pivot pin 19, the hydraulic cylinders 14 pull the supporting frame 8 powerfully downward, whereupon the transverse shackles of lock pin parts 12 cooperate in a locking fashion with their rotary latch locks 13.

The pivoting drive of the supporting frame 8 by the hydraulic cylinders 14 is especially advantageous if an electrohydraulic system is provided in any case for actuating the folding roof 4, so that it can be incorporated into the complete system.

Apart from this, the drive system described is suitable in a correspondingly adapted design for moving all kinds of lockable vehicle panels, for example lids, hoods, panes, or the like which are intended for energy-assisted operation.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A drive system for moving a lockable vehicle part, comprising:

a drive element which operates with a change in length, said drive element supportable at its ends on the lockable vehicle part and on a support body respectively;

a releasable snap for locking the lockable vehicle part is locked in at least one end position, said releasable snap lock having a release mechanism such that the releasable snap lock is released by a control stroke of the driving element, said control stroke being actively connected with the release mechanism of the snap lock, said control stroke preceding a working stroke of the drive element to move the vehicle part by connecting one end of the driving element with the release mechanism;

wherein said release mechanism is a rotary joint actively connected to the control stroke of the driving element;

wherein said rotary joint comprises a pivot pin mounted on the support body and slidably guided in an elongate hole of the driving element;

wherein a length of the elongate hole is set according to the control stroke of the drive element, and wherein the pivot pin is automatically locked in opposite end positions in the elongate hole; and further comprising a leaf spring pair arranged in the elongate hole for locking the pivot pin in its opposite end positions in the elongate hole, said leaf spring pair being arranged such that a displacement path of the pivot pin is increasingly narrowed toward a center of the length of the elongate hole.

2. The drive system according to claim 1, wherein said driving element is a hydraulic cylinder.

3. The drive system according to claim 1, wherein the elongate hole is arranged at one end area of the drive element.

4. The drive system according to claim 3, wherein the drive element has a foot portion and wherein the elongate hole is formed in the foot portion of the drive element and the pivot pin is mounted immovably on the support body.

5. The drive system according to claim 1, wherein the drive element is a double-acting hydraulic cylinder operating with a change in length.

6. A drive system for moving a lockable vehicle part, comprising:

a drive element which operates with a change in length, said drive element supportable at its ends on the lockable vehicle part and on a support body respectively;

a releasable snap lock for locking the lockable vehicle part in at least one end position, said releasable snap lock having a release mechanism such that the releasable snap lock is released by a control stroke of the driving element, said control stroke being actively connected with the release mechanism of the snap lock, said control stroke preceding a working stroke of the drive element to move the vehicle part by connecting one end of the driving element with the release mechanism;

wherein said release mechanism is a rotary joint actively connected to the control stroke of the driving element;

a motor vehicle lid;

a pivotable supporting frame for the motor vehicle lid, said pivotable supporting frame being movable by the driving element; and wherein the motor vehicle lid is mounted to pivot in an opposite direction from the pivotable supporting frame on the pivotable supporting frame.

7. The drive system according to claim 6, wherein the drive element is a double-acting hydraulic cylinder operating with a change in length.

8. A drive system for moving a vehicle part, comprising:

a drive element operating with a change in length and having a control stroke and a working stroke, said drive element connectable at one end to the vehicle part and being supported at another end on a support;

a lock arrangeable in one end region of the vehicle part;

a rotary joint provided as a release mechanism for the lock, said rotary joint being connected at one end of the drive element such that the control stroke for moving the vehicle part, causes the rotary joint to release the lock;

wherein said rotary joint comprises a pivot pin mounted on the support body and slidably guided in an elongate hole of the driving element;

wherein a length of the elongate hole is set according to the control stroke of the drive element, and wherein the pivot pin is automatically locked in opposite end positions in the elongate hole; and further comprising a leaf spring pair arranged in the elongate hole for locking the pivot pin in its opposite end positions in the elongate hole, said leaf spring pair being arranged such that a displacement path of the pivot pin is increasingly narrowed toward a center of the length of the elongate hole.

* * * * *